United States Patent
Glasenapp

(10) Patent No.: US 11,982,878 B2
(45) Date of Patent: May 14, 2024

(54) METHOD AND DEVICE FOR MEASURING THE LOCAL REFRACTIVE POWER AND/OR REFRACTIVE POWER DISTRIBUTION OF A SPECTACLE LENS

(71) Applicant: Carl Zeiss Vision International GmbH, Aalen (DE)

(72) Inventor: Carsten Glasenapp, Oberkochen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 410 days.

(21) Appl. No.: 17/504,905

(22) Filed: Oct. 19, 2021

(65) Prior Publication Data

US 2022/0035183 A1 Feb. 3, 2022

Related U.S. Application Data

(63) Continuation-in-part of application No. PCT/EP2020/061238, filed on Apr. 22, 2020.

(30) Foreign Application Priority Data

Apr. 23, 2019 (EP) .................................... 19170715

(51) Int. Cl.
  *G02C 13/00* (2006.01)
  *G01M 11/02* (2006.01)
  *G06T 7/73* (2017.01)

(52) U.S. Cl.
  CPC ....... *G02C 13/005* (2013.01); *G01M 11/0228* (2013.01); *G06T 7/73* (2017.01)

(58) Field of Classification Search
  CPC ..... G02C 13/005; G06T 7/73; G01M 11/0228
  See application file for complete search history.

(56) References Cited

U.S. PATENT DOCUMENTS 10,019,140 B1    7/2018 Bell et al.
2013/0155393 A1*    6/2013 Blonde .............. G01M 11/0228
                                                   356/125

(Continued)

FOREIGN PATENT DOCUMENTS

EP    2608109 A1    6/2013
EP    3730036 A1    10/2020

(Continued)

OTHER PUBLICATIONS

"Ophthalmic optics—Spectacle lenses—Vocabulary" (ISO 13666:2012); German and English version EN ISO 13666:2012, Oct. 2013.

(Continued)

*Primary Examiner* — Daniel G Mariam
(74) *Attorney, Agent, or Firm* — Tautz & Schuhmacher LLC; Georg Hasselmann

(57) ABSTRACT

The local refractive power or the refractive power distribution of a spectacle lens is measured. A first image of a scene having a plurality of structure points and a left and/or a right spectacle lens of a frame front is captured with an image capturing device from a first capture position having an imaging beam path for structure points, which extends through the spectacle lens of the frame front. At least two further images of the scene are captured with the image capturing device from different capture positions, one of which can be identical with the first capture position, without the spectacle lenses of the spectacles or without the frame front containing the spectacle lenses having the structure points imaged in the first image, and the coordinates of the structure points in a coordinate system are calculated from the at least two further images of the scene by image analysis.

34 Claims, 8 Drawing Sheets

(56) References Cited

U.S. PATENT DOCUMENTS

2015/0029323 A1   1/2015  Nagao
2015/0362998 A1  12/2015  Park et al.
2020/0088603 A1   3/2020  Glasenapp et al.

FOREIGN PATENT DOCUMENTS

EP       3730037 A1  10/2020
EP       3730918 A1  10/2020
WO    2016076530 A1   5/2016
WO    2016207412 A1  12/2016
WO    2017134275 A1   8/2017

OTHER PUBLICATIONS

Teichman et al. "Unsupervised intrinsic calibration of depth sensors via SLAM," Robotics: Science and Systems 2013, Berlin, Germany, Jun. 24 to 28, 2013.
European Search Report issued in EP 19170715.7, to which this application claims priority, completed Oct. 30, 2019.
Hartley et al. "Multiple View Geometry," pp. 153 to 193, Cambridge University Press 2004.
Kutulakos et al. "A Theory of Refractive and specular 3D Shape by Light-Path Triangulation," International Journals of Computer Vision, vol. 76, issue 1, pp. 1 to 32, 2008.
International Preliminary Report on Patentability issued in PCT/EP2020/061238, to which this application claims priority, completed Aug. 6, 2021 and English-language translation thereof.
International Search Report issued in PCT/EP2020/061238, to which this application claims priority, mailed Jul. 24, 2020 and English-language translation thereof.

\* cited by examiner

METHOD AND DEVICE FOR MEASURING THE LOCAL REFRACTIVE POWER AND/OR REFRACTIVE POWER DISTRIBUTION OF A SPECTACLE LENS

CROSS REFERENCE TO RELATED APPLICATIONS

This application is a continuation-in-part application of international patent application PCT/EP2020/061238, filed Apr. 22, 2020, designating the United States and claiming priority from European patent application 19170715.7, filed Apr. 23, 2019, and the entire content of both applications is incorporated herein by reference.

TECHNICAL FIELD

The disclosure relates to a method for measuring the local refractive power and/or the refractive power distribution of a left and/or a right spectacle lens, typically in a spectacle frame. Moreover, the disclosure relates to a computer program product having a computer program with program code, and to an apparatus for carrying out the method.

BACKGROUND

In order to facilitate in-focus vision for a spectacle wearer, the spectacle lenses must be correctly positioned and aligned in relation to the eyes of the spectacle wearer in the spectacle frame. In principle, the correct alignment and positioning is required in all spectacle lenses. The correct alignment and positioning of the spectacle lenses is especially important in the case of, in particular, individualized optical spectacle lens designs, toric spectacle lens designs, spectacle lenses with a significant dioptric power, and progressive addition spectacle lenses. Progressive addition spectacle lenses allow spectacle wearers in-focus vision in different use situations, e.g., at different distances, by changing the viewing direction only, without this requiring a relatively large accommodation success of the eyes in the process. Pursuant to DIN EN ISO 13666:2013-10, paragraph 8.3.5, progressive addition spectacle lenses are spectacle lenses with at least one progressive surface, that provides increasing (positive) dioptric power as the wearer looks down. Individualized spectacle lenses and/or progressive addition spectacle lenses have one or more reference points, e.g., a distance visual point and a near visual point, the relative position of which, depending on the use situation, must be adapted to the location of the pupils of the eyes of a spectacle wearer. Pursuant to DIN EN ISO 13666:2013-10, paragraph 5.16, the distance visual point is the assumed position of the visual point on a lens, which is used for distance vision under given conditions. Pursuant to DIN EN ISO 13666:2013-10, paragraph 5.17, the near visual point is the assumed position of the visual point on a lens, which is used for near vision under given conditions. Toric spectacle lens designs moreover need the correct orientation of their cylindrical power for a spectacle wearer.

WO 2016/207412 A1 has disclosed a method and apparatus of the type set forth at the outset. It describes measuring the local refractive power of a left and/or right spectacle lens in a spectacle frame using a measuring apparatus in which the spectacle frame is arranged. This measuring apparatus contains an image capture device and a display for the display of a test structure, the relative position of which is known in relation to the image capture device. The image capture device is used to capture the test structure, which is displayed on the display, by means of an imaging beam path that passes through the left and/or the right spectacle lens in the spectacle frame. Additionally, a portion of the spectacle frame which defines a coordinate system of the spectacle frame is captured by means of the display. Then, the local refractive power of the left and/or right spectacle lens in a coordinate system referenced to the coordinate system of the spectacle frame is determined in a computer unit by means of image processing from the captured portion of the spectacle frame and the captured image representation of the test structure, and from the coordinates of the test structure and the captured image representation of the test structure.

EP 2 608 109 A1 discloses a method for ascertaining a refractive power of a spectacle lens in the worn position. In this case, a recording of the spectacle wearer without a spectacle frame and a recording of the spectacle wearer with the spectacle frame are captured and the size of the iris is ascertained in both recordings. The refractive power of the spectacle lens is deduced from the size difference and the focal length of the camera. The spectacles need to be worn by the spectacle wearer for this method. Moreover, this method does not facilitate a local determination of the refractive power of individual points in the spectacle lens, or the determination of the individual beam paths through the spectacle lens.

US 2015/0362998 A1 and U.S. Pat. No. 10,019,140 B1 each described a method for determining the distance of the face of a person from an image capture device capturing the face by means of photogrammetry.

WO 2016/076530 A1 has disclosed a method for measuring the refractive power of a pair of spectacles, in which the refractive power of the lens is deduced from a difference in size of an object in a recording without the spectacle lens and in a recording through the spectacle lens.

US 2015/0029323 A1 describes an image processing apparatus with a memory and with a processor coupled to the memory, the processor serving to determine the optical properties of a pair of spectacles by evaluating images of the spectacle wearer which are captured by means of an image capture device and which show the spectacle wearer with and without spectacles. US 2015/0029323 A1 specifies that the refractive power of a spectacle lens in the pair of spectacles should be determined on the basis of the relative spatial position of a facial contour of the face of a spectacle wearer captured through a pair of spectacles with spectacle lenses and on the basis of the relative spatial position of a captured facial contour of this face-spectacles.

SUMMARY

It is an object of the disclosure to determine the focal or the dioptric power of a left and/or a right spectacle lens, in each case for distance and/or for near vision, in a simple manner and without much apparatus outlay. In particular, it is an object of the disclosure to ascertain a local refractive power at different locations on a spectacle lens, i.e., a refractive power distribution, with great accuracy.

This object is achieved by the method for measuring the local refractive power and/or the refractive power distribution taught herein. Exemplary embodiments of the disclosure are discussed below.

In the method for measuring the local refractive power and/or the refractive power distribution of a left and/or a right spectacle lens in a spectacle frame taught herein, at least one first image representation of a scene is captured from at least one first recording position by means of at least one image capture device in a first step, wherein this at least one first image representation has at least one structure point and contains a left and/or a right spectacle lens in a spectacle frame, wherein the at least one imaging beam path for each of these structure points passes through the first or the second spectacle lens of the spectacle frame.

This disclosure understands refractive power to mean the focal power or the dioptric power of a spectacle lens. As per the definition specified in paragraph 9.2 of DIN EN ISO 13666:2013-10, this disclosure understands focal power to mean the general term comprising the spherical and astigmatic powers of a spectacle lens. As per the definition specified in paragraph 9.3 of DIN EN ISO 13666:2013-10, this disclosure understands dioptric power of a spectacle lens to mean the general term comprising the focal power and the prismatic power of the spectacle lens. As per the definition specified in paragraph 10.9 of DIN EN ISO 13666:2013-10, this disclosure understands prismatic effect of a spectacle lens to mean the collective name for the prismatic deviation and base setting.

This disclosure understands local refractive power to mean the local focal power or the local dioptric power of a spectacle lens.

This disclosure understands refractive power distribution to mean the spatially resolved focal power or the spatially resolved dioptric power of a spectacle lens.

The disclosure understands a scene to be a portion of an environment which can be captured by the at least one image capture device, for example by at least one digital camera, which may be integrated in a smartphone or tablet computer, for example. By way of example, a scene can be a portion of a room in a home or a portion of a store, or else part of a scenery. However, the scene may also contain a face or only a left eye and/or a right eye of a spectacle wearer of the pair of spectacles.

In the present case, at least one structure point of the scene is understood to mean a geometric point, the image of which in at least one image representation or recording of the scene obtained by capturing the scene with at least one image capture device can clearly be recognized on account of a brightness and/or color of an image of points adjacent to this point being different from that of the image of this point. By way of example, a structure point can be located at a corner or edge of a structure in the scene.

However, the term structure point of a scene in the present case also includes a point in a stationary, time-invariant pattern, for example at least one point in a regular or irregular point pattern, at least one point in a regular or irregular stripe pattern, at least one point in a regular or irregular check pattern, at least one point in a barcode, at least one point in a 2-D code and/or at least one point within written text, for example in a newspaper or a book or an electronic display device, for example a monitor. In particular, at least one stationary, time-invariant structure point in a scene can be at least one point on a structured surface, for example a structured tablecloth, and/or on structured wallpaper.

However, in the present case structure point of a scene is also understood to mean at least one point in a scene, the relative position of which can change over time, for example at least one moving point in the face of a spectacle wearer, for instance a point on the eyebrows, on the lips or a point located on the iris. If the relative position of the at least one structure point in a scene varies over time, it is preferable to reconstruct the displacement thereof as far as possible and then take this into account when determining the local refractive power of a left and/or right spectacle lens. Should the displacement of such a structure point not be reconstructible, it is advantageous if this structure point is not taken into account when determining the local refractive power and/or the refractive power distribution of a left and/or right spectacle lens.

The disclosure typically understands at least one image capture device to be a digital camera integrated in, for example, a mobile terminal such as a cellular telephone, a smartphone, or a tablet computer. The digital camera can be embodied as a stereo camera, as a multi-camera, as an image sensor with an objective lens, or as an image sensor with at least two objective lenses, and/or as a so-called plenoptic camera. It should be observed that a mobile terminal specified above may also have a plurality of image capture devices in the form of a digital camera.

In particular, a mobile terminal should be understood to mean an apparatus which comprises at least one programmable processor and at least one image capture device, e.g., at least one camera, and at least one acceleration sensor, and which is typically designed to be carried, i.e., configured in respect of dimensions and weight so that a person is capable of carrying it along. Further components can be present in the mobile terminal, such as for example at least one screen, at least one light source for, e.g., visible light from a wavelength range of 380 nm to 780 nm and/or infrared light from a wavelength range of 780 nm to 1 mm and/or at least one light receiver with a sensitivity to, e.g., visible light from a wavelength range of 380 nm to 780 nm and/or infrared light from a wavelength range of >780 nm to 1 mm. Typical examples of such mobile terminals are smartphones or tablet PCs which may comprise at least one screen, for example a sensor screen (touchscreen), at least one image capture device, for example at least one camera, at least one acceleration sensor, at least one light source, at least one light receiver and further components, such as wireless interfaces for mobile radio or WLAN (wireless LAN).

In the present case, an imaging beam path for structure point is understood to mean the course of the light beams which bring about optical imaging of the structure point from the scene into the image representation of the scene in at least one image capture device as a structure point image. As a consequence, an optical axis that forms an axis of symmetry is referred to as a chief ray of the imaging beam path for a structure point.

In an exemplary embodiment of a method for measuring the local refractive power and/or the refractive power distribution, at least two further image representations of the scene without the first and/or the second spectacle lens of the spectacle frame or without the spectacle frame containing the first and/or the second spectacle lens but with the structure points imaged the first image representation are captured in a further step, which may lie before or after the first step in time or which may be implemented simultaneously with the first step, by means of at least one image capture device from at least two different recording positions, wherein at least one of the recording positions can be identical with the at least one first recording position. The at least one image capture device in the further step can be identical or different to the at least one image capture device from the first step. Typically, the at least one image capture device in the further step is identical to the at least one image capture device from the first step. Thereupon, the coordinates of the structure points are determined in a coordinate system from the at least two further image representations of the scene by means of image evaluation, typically by means of triangulation, in a calculation step. Subsequently, the local refractive power is determined in a step of determining a local refractive power for at least one portion of the left spectacle lens and/or one portion of the right spectacle lens from the coordinates of the structure points and the image of the structure points in the at least one first image representation of the scene.

An exemplary embodiment of a method for measuring the local refractive power and/or the refractive power distribution of a left and/or a right spectacle lens in a spectacle frame provides for at least one first image representation of a scene to be captured from at least one first recording position by means of at least one image capture device in a first step, wherein this at least one first image representation has at least one structure point and contains a left and/or a right spectacle lens in a spectacle frame, wherein the at least one imaging beam path for each of these structure points passes through the first or the second spectacle lens of the spectacle frame.

As specified above, the imaging beam path for a structure point is understood in the present case to mean the course of the light beams which bring about optical imaging of the structure point from the scene into the image representation of the scene captured by means of at least one image capture device as a structure point image. As a consequence, an optical axis that forms an axis of symmetry is referred to as a chief ray of the imaging beam path for a structure point.

In a further step, which can temporally precede or succeed the first step or can be carried out simultaneously with the first step, at least two further image representations of the scene are captured with the left and/or the right spectacle lens in a spectacle frame by means of at least one image capture device from at least two different further recording positions that differ from the first recording position, each with at least one imaging beam path for the structure points captured in the first image representation, wherein the at least one imaging beam path does not pass through the first and the second spectacle lens of the spectacle frame. The coordinates of the structure points in a coordinate system are then calculated in a further step from the respective at least one beam path of the structure points, which have not passed through the left and right spectacle lens, by means of image evaluation, typically by means of triangulation. Subsequently, the local refractive power for at least one portion of the left spectacle lens and/or for at least one portion of the right spectacle lens is determined in each case from the coordinates of the structure points and the image of the structure points in the at least one first image representation of the scene.

In an exemplary embodiment of a method for measuring the local refractive power and/or refractive power distribution of a left and/or right spectacle lens, typically in a spectacle frame, as specified above, a multiplicity of structure points in a scene are captured from in each case at least one first recording position in in each case a first image representation of the scene and the steps following the capture are undertaken on the basis of this respective multiplicity of structure points.

In the present case, a multiplicity of structure points is understood to be a set of points consisting of at least three structure points. It is advantageous if the measurement of the local refractive power of a left and/or right spectacle lens is implemented on the basis of at least 10, typically at least 100, particularly typically at least 1,000 and very particular typically at least 10,000 structure points. It is expedient if the local refractive power of a left and/or right spectacle lens is measured on the basis of a number Z of a structure points, for which the following applies: $100 \leq Z \leq 1{,}000$.

By virtue of measuring the local refractive power of a multiplicity of different locations of the left and/or right spectacle lens, it is possible to determine a refractive power distribution for the left and/or right spectacle lens.

The image evaluation of each image representation typically comprises image processing techniques, for example classification, segmentation, and triangulation. With the aid of object recognition methods, such as segmentation and classification, each image representation is typically examined for objects of the classes of a scene and/or spectacle frame. The object recognition methods can be both of a conventional type, for example thresholding, edge-based or region-based segmentation, or optical flow, and of a learning type. If the object recognition methods are of the learning type, for example if learning algorithms are applied, it is expedient to train a neural network with augmented training data as a preliminary step. The result of each of these object recognition methods is the absolute position, relative position, and boundary of the objects, in this case of the classes of scene and/or spectacle frame. Additional information relates to the existence of the respective objects in the respective image representations. By way of example, it is possible to recognize in this way whether or not a spectacle frame and/or spectacle lens is present in the image representation. Consequently, the assignment as to whether this relates to a first image representation or a further image representation can also be implemented after the respective recording thereof. The assignment as to whether this is a first or second image representation can furthermore be implemented without knowledge as to whether this was a first image representation or a further image representation.

In the methods specified above, the structure points can be only stationary in each case or be both stationary and time-invariant in each case. Alternatively, the displacement of the at least one structure point may be known in each case and/or the displacement thereof may be reconstructible and taken into account when determining the refractive power distribution. Typically, the structure points are stationary in each case, particularly typically stationary and time-invariant in each case.

From the refractive power distribution of a left and/or a right spectacle lens or at least a portion of a left and/or right spectacle lens determined in one of the above-described methods, it is possible to deduce the local refractive power at a certain location of the spectacle lens.

In the above-described method, the edge or the edge curve of the left and/or right spectacle lens can be optionally captured in a spectacle frame in the respective first step, within the scope of which at least one first image representation of a scene is captured from at least one first recording position by means of at least one image capture device.

Typically, the edge curve is the shape-determining boundary of the spectacle lens located on the front surface of the spectacle frame distant from the face, and it partly or wholly coincides with the inner edge of the spectacle frame lying on the front in the case of half rim or full rim spectacles. In the case of full rim spectacles, the edge curve on the front surface of the spectacle frame distant from the face is the same as the lens outer edge located on the front side or the frame inner edge located on the front side. In the case of half rim spectacles, the edge curve on the front surface of the spectacle frame distant from the face is the same as the lens outer edge located on the front side or the frame inner edge located on the front side, provided there is a structure provided by the frame. To the extent that there is no structure provided by the frame in the case of half rim spectacles, the edge curve is the same as the lens outer edge located on the front side in the front surface of the spectacle frame distant from the face. In the case of rimless spectacles, there is no analogous structure of the frame, i.e., the term edge curve here always denotes the lens outer edge located on the front side in the front surface of the spectacle frame distant from the face.

If an image capture device arranged in a mobile terminal and containing at least two digital cameras, a stereo camera, a multi-camera, a camera chip with at least two objectives or a plenoptic camera is used in an exemplary embodiment of a method for measuring the local refractive power and/or the refractive power distribution, it may be sufficient to capture a single image representation of the scene with the spectacle frame containing the first and/or the second spectacle lens, wherein this one first image representation has at least one structure point, and to capture a single further image representation of the scene without the spectacle frame containing the first and/or second spectacle lens but with the same structure points as in the first image representation of a scene. To increase the accuracy of the method for measuring the local refractive power and/or the refractive power distribution, at least two image representations of the scene are typically captured with the spectacle frame containing the first and/or the second spectacle lens and at least two image representations of the scene are captured without the spectacle frame containing the first and/or the second spectacle lens.

If an image capture device arranged in a mobile terminal and containing at least two digital cameras, a stereo camera, a multi-camera, a camera chip with at least two objectives or a plenoptic camera is used in an exemplary embodiment of a method for measuring the local refractive power and/or the refractive power distribution, it may be sufficient to capture a single image representation of the scene with the spectacle frame containing the first and/or the second spectacle lens, wherein this one first image representation has at least one structure point, when the at least one imaging beam path for each of these structure points passes through the first and/or the second spectacle lens, and to capture a single further image representation of the scene with the spectacle frame containing the first and/or the second spectacle lens, wherein this at least one further image representation is recorded from a recording position that differs from the first recording position such that the at least one imaging beam path for each of these structure points does not pass through the first and the second spectacle lens of the spectacle frame. In this exemplary embodiment of a method for measuring the local refractive power and/or the refractive power distribution, typically at least two first image representations of the spectacle frame and at least two further image representations of the scene with the spectacle frame from recording positions that differ from the first two recording positions are also created in order to increase the accuracy thereof.

To measure spectacle lenses with a significant negative refractive power, i.e., with a principal meridian with a negative refractive power of less than or equal to −3 dpt, it is advantageous if the scene for determining the local refractive power and/or the refractive power distribution of a left and/or right spectacle lens, in each case typically in a spectacle frame, contains at least one structure point, typically at least one stationary, time-invariant structure point, which is captured through a left and/or right spectacle lens and which has a distance from the respective spectacle lens to be measured which is typically between 5 mm and 200 mm.

In this case, the distance of a structure point from a spectacle lens is understood to mean in each case the distance of the structure point from the intersection point of the chief ray of the imaging beam path on the side of the spectacle lens facing the structure point. It should be observed that as a result of capturing further image representations of the scene from further, different recording positions it is possible, as a matter of principle, to specify the chief ray for optical imaging into the image capture device for each structure point in the aforementioned distance range.

To measure spectacle lenses with a significant positive refractive power, i.e., with the principal meridian with a positive refractive power of greater than or equal to +3 dpt, it is advantageous if the scene for determining the local refractive power and/or the refractive power distribution of a left and/or right spectacle lens, in each case typically in a spectacle frame, contains at least one structure point, typically at least one stationary, time-invariant structure point, which is captured through a left and/or right spectacle lens and which has a distance from the respective spectacle lens to be measured which is typically located in front of the focal spot of the stronger principal meridian. This distance typically ranges between 5 mm and 100 mm.

To measure spectacle lenses with a low refractive power, i.e., with a principal meridian with a negative refractive power of less than −3 dpt or with a principal meridian with a positive refractive power of greater than +3 dpt, good measurement results are obtained in the case of scenes with at least one structure point, typically at least one stationary, time-invariant structure point, the distance of which from the respective spectacle lens to be measured, which is typically located in a spectacle frame, is up to 600 mm, typically ranging from 5 mm to 500 mm.

A discovery of the disclosure is that, in particular, the local refractive power and/or refractive power distribution of a spectacle lens can be determined very accurately with the method according to the disclosure if the distance of at least one structure point, typically at least one stationary, time-invariant structure point, in a scene from a spectacle lens in a spectacle frame ranges between 10 mm and 50 mm, typically between 30 mm and 40 mm.

An exemplary embodiment of the disclosure provides for a multiplicity of first image representations of the scene and a multiplicity of further image representations of the scene to be captured, in each case including the spectacle lens, the local refractive power and/or refractive power distribution of which is intended to be ascertained, wherein this spectacle lens is typically situated in a spectacle frame. Alternatively, the spectacle frame can also be removed from the scene when recording the multiplicity of a further image representations. For capturing a multiplicity of first image representations of the scene and a multiplicity of further image representations of the scene, it is advantageous if these span at least a part of a hemisphere or a hemisphere, in each case around the scene, and/or cover a multiplicity of different recording positions with different recording directions and/or recording distances. This is because the coordinates of the at least one structure point can be calculated from the multiplicity of further image representations of the scene.

A corresponding large number of captured first image representations of the scene and captured further image representations of the scene increase the accuracy of the method for measuring the local refractive power and/or the refractive power distribution of a left and/or a right spectacle lens, which is typically in a spectacle frame.

By virtue of capturing a multiplicity of image representations of the scene, in particular of the head, by means of the image capture device while displacing the at least one image capture device or, in the case of a stationary image capture device, while rotating the scene, in particular the head, wherein the left eye and/or the right eye of the spectacle wearer of the spectacle frame gazes at the displaced image capture device and, from the multiplicity of image representations of the scene, in particular of the head, captured in the process, viewing beam paths for different viewing directions of the left eye and/or the right eye of the spectacle wearer of the spectacle frame are calculated through the left spectacle lens and/or the right spectacle lens and a local refractive power k(x,y) of the left spectacle lens and/or the right spectacle lens is determined for each viewing direction, it is possible to determine the local refractive power of the spectacle lenses in the spectacle frame worn by the spectacle wearer for a viewing direction chosen by a spectacle wearer.

Measuring the local refractive power and/or the refractive power distribution of a left and a right spectacle lens in a spectacle frame allows, in particular, statements to be made about the so-called binocular power of a pair of spectacles, i.e., a spectacle frame including both spectacle lenses. A binocular power should be understood to mean the assessment of the focal or dioptric power of the left and right spectacle lens for a certain direction of view. A binocular power can also comprise imaging aberrations in the spectacle lens of higher order, such as, e.g., coma, or else prismatic aberrations.

Measuring the local refractive power and/or refractive power distribution of a left and a right spectacle lens in a spectacle frame allows recognition of whether the astigmatic power of the spectacle lens comprising the difference of the refractive power in the principal meridians and their directions, for example, deviates significantly from the binocular target values for a certain direction of view. In this case, the binocular target values should be understood to mean the subjectively ascertained refraction comprising sphere, cylinder with axis, and prism with base of both eyes. A deviation from the binocular target values is not noticeable or only slightly noticeable by a spectacle wearer if, for example, the deviation of the astigmatic power of the left and the right spectacle lens from the binocular target values is the same. However, this deviation from the binocular target values is clearly noticeable by the spectacle wearer if the deviation of the astigmatic power of the left and the right spectacle lens from the binocular target values differs.

It should be observed that an incorrect prismatic effect between the right and left spectacle lens is perceived as very uncomfortable by a spectacle wearer. In this case, an incorrect nasal prismatic power is more likely to be accepted by a spectacle wearer than an incorrect temporal prismatic power and/or an incorrect vertical prismatic power.

The above-specified method in particular offers the advantage that a simultaneous measurement of a right and a left spectacle lens in a spectacle frame allows determination of the prismatic power deviation between the left spectacle lens and the right spectacle lens from a binocular target value in a wear situation.

An exemplary embodiment of the disclosure provides for the coordinates of the structure points to be calculated in a coordinate system by evaluating displacements of the image representations of the structure points in the scene in the recordings from different recording positions. In this case, methods of detecting features, so-called "feature detection methods," can be used, for example gradient-based feature descriptors such as Scale-Invariant Feature Transform (SIFT) and Speeded Up Robust Features (SURF) features or binary feature descriptors such as Binary Robust Independent Elementary Features (BRIEF) of Binary Robust Invariant Scalable Keypoints (BRISK) features, as is described in, e.g., the article "A comparison of feature descriptors for visual SLAM" by J. Hartmann, J. Klüssendorff and Erik Maehle, European Conference on Mobile Robots 2013, the entirety of which is referenced herewith and the disclosure of which is incorporated in the description of this disclosure.

The coordinates of the structure points can be related to any fixed coordinate system, in particular a coordinate system defined in relation to a recording position by the at least one image capture device. Typically, this coordinate system is referenced to the coordinate system of the spectacle frame, which may be defined by a section of the spectacle frame. In this case, two coordinate systems that are referenced to one another are understood to mean coordinate systems, for which it is known what the coordinates of a point or a vector in one coordinate system are in the other coordinate system. In particular, what can be achieved by determining distances between the coordinates of the structure points is that the local refractive power and/or the refractive power distribution of a left and/or right spectacle lens in a spectacle frame can be determined, even on the basis of scenes with variations over time, for example the face of the spectacle wearer.

In a further exemplary embodiment of the disclosure, provision is made for a displacement of at least one structure point in a coordinate system to be recognized by evaluating the proximity relations between the structure points in the scene, and for the coordinates of at least one structure point displaced in a scene not to be taken into account when determining the local refractive power and/or refractive power distribution for at least one section of the right spectacle lens and/or the left spectacle lens in the coordinate system of the spectacle frame.

What can be achieved in this way is that movements of structure points in a scene have no influence on the measurement result for the local refractive power and/or refractive power distribution of a left and/or right spectacle lens in a spectacle frame and do not falsify the measurement result.

In particular, the disclosure is based on the concept that recording a multiplicity of image representations of a scene, in particular recording a film or video sequence of a scene, from different recording positions and/or recording directions using at least one image capture device facilitates, if the scene contains characteristic structure features with at least one structure point, the calculation of so-called intrinsic parameters of the at least one image capture device and the relative spatial position thereof in relation to the scene by means of image processing, for example using SLAM algorithms, i.e., algorithms for simultaneous localizing and mapping (Simultaneous Localization and Mapping), as described in the publication "Unsupervised intrinsic calibration of depth sensors via SLAM," by A. Teichman et al., Robotics: Science and Systems 2013, Berlin Germany, Jun. 24 to 28, 2013," the entirety of which is referenced herewith and the disclosure of which is incorporated in the description of this disclosure. It is advantageous here if the scene contains characteristic structure features with a multiplicity of uniquely defined, typically stationary, time-invariant structure points. By way of example, such characteristic structure features can be brightness profiles on objects with for example a point of intersection of two edge lines, characteristic colors of objects or else characteristic geometric forms of objects.

The disclosure understands intrinsic parameters of an image capture device to be the focal length f of a camera in the image capture device, the coordinates of the image center $Z_x$ and $Z_y$, the shearing parameter s and scaling parameters $m_x$ and $m_y$ on account of differently scaled coordinate axes from the image plane. These parameters are combined in a camera calibration operator:

$$\overline{K} = \begin{pmatrix} f \cdot m_x & s & Z_x \cdot m_x \\ 0 & f \cdot m_y & Z_y \cdot m_y \\ 0 & 0 & 1 \end{pmatrix}$$

Within the scope of the disclosure, intrinsic parameters of a camera can also be distortion parameters that serve to determine image distortions, in particular the radial and tangential distortion. The intrinsic parameters of an image capture device describe how a 3-D coordinate of an object point is imaged in an image plane of the image capture device or how, given a point in the image plane, the associated beam path can be calculated in a coordinate system that is stationary in relation to the image capture device.

The relative position of an image capture device in relation to a coordinate system in space is described by a rotation operator $$\overline{R} = \begin{pmatrix} R_{11} & R_{12} & R_{13} \\ R_{21} & R_{22} & R_{23} \\ R_{31} & R_{32} & R_{33} \end{pmatrix}$$

where $$det\overline{R} = 1,$$

which defines the rotation of the camera around the center of the coordinate system, and a translation vector $$\vec{T} = \begin{pmatrix} t_1 \\ t_2 \\ t_3 \end{pmatrix},$$

which defines the displacement of the camera center relative to the origin of the coordinate system. A coordinate c in this coordinate system is mapped by the mapping rule $$f(c) = \overline{K} \cdot (\overline{R} \cdot c + \vec{T})$$

and the calculation of the associated two-dimensional inhomogeneous coordinates by means of dividing the result vector by its third coordinate on the corresponding 2-D coordinates on the image plane of the camera.

Conversely, for a two-dimensional pixel coordinate y in homogeneous coordinates on the image plane of the camera, the mapping rule $$g(y) = \overline{R}^T \cdot (\overline{K}^{-1} \cdot y - \vec{T})$$

can be used to determine the associated light ray that is imaged on this coordinate.

This is presented in detail on pages 153 to 193 of the book "Multiple View Geometry" by R. Hartley and A. Zisserman, Cambridge University Press 2004, the entirety of which being referenced herewith and the disclosure of which is incorporated in the description of this disclosure.

The multiplicity of image representations of a scene are used to determine the information about a 3-D model of the scene without the spectacle frame, the information about the absolute position and the relative position of the spectacle frame in the scene and the information about the position of the at least one image capture device in the scene for each individually recorded image, i.e., for each time of a recording. From this, beam paths through the spectacle lenses are ascertained in order to then calculate the local refractive power and/or refractive power distribution of the left and/or right spectacle lens therefrom.

An advantageous development of the disclosure therefore provides for a SLAM algorithm to be used for calculating the coordinates of the at least one structure point. In this way, it is possible to increase the accuracy of the calculation of the coordinates and the positions of the image capture devices and to minimize computational outlay for determining the coordinates of at least one structure point in a scene, and hence keep the computation time required to this end short.

In particular, from image representations of one and the same scene, which are captured from different recording positions and which therefore show the scene from different perspectives, a SLAM algorithm facilitates the calculation of both a three-dimensional geometry of the scene and the positions of the at least one image capture device in each case adopted by the latter when capturing image representations of the scene. A SLAM algorithm comprises a feature recognition routine, which detects features present in the scene, and a matching routine, by means of which the corresponding feature in the images recorded from different recording positions is recognized for each feature in a recording. From the corresponding positions of each feature in the image recordings, a three-dimensional model of the scene is created on the basis of the intrinsic parameters of the at least one image capture device and the positions, belonging to the recordings, of the image capture devices in space.

A non-transitory computer program product according to the disclosure contains a computer program with program code for carrying out the aforementioned method steps when the computer program is loaded on a computer unit and/or executed on a computer unit. A portable non-transitory computer program product or data medium can be embodied as a portable hard-drive, a floppy disk, a USB stick, or a compact disk, for example.

An apparatus according to the disclosure for measuring the local refractive power and/or the refractive power distribution of a left and/or right spectacle lens in a spectacle frame contains at least one image capture device and a computer unit, on which a computer program with program code for carrying out the aforementioned method steps is loaded.

In particular, such an apparatus can be embodied as a smartphone or as a tablet computer or else as a digital camera. Below, exemplary embodiments of the disclosure, which are schematically depicted in the drawings, are described.

The accuracy of a SLAM algorithm, which determines both the absolute position and/or the relative position of the at least one image capture device and the position of the structure points in the image representation, is typically determined by the calibration of the at least one image capture device utilized. Such a calibration is able to assign a three-dimensional light ray incident in the respective image capture device from the relative position of each pixel coordinate C of the at least one image capture device. Mathematically, such a calibration can be expressed as an intrinsic camera calibration operator $\overline{K}$, which contains the above-described intrinsic parameters. By way of example, this camera calibration operator $\overline{K}$ can be determined from a recording of a special calibration pattern, for example a checkerboard pattern or a point pattern, by means of the at least one image capture device. As an alternative thereto, it is also possible to determine the intrinsic camera calibration operator $\overline{K}$ by evaluating a multiplicity of image representations of at least one scene directly from the multiplicity of image representations of the scene, which may be based on different recording positions.

By means of the above-described calibration, the SLAM algorithm can assign to each structure point a multiplicity of three-dimensional light rays incident in the respective image capture device, which light rays do not pass through the left and the right spectacle lens. These can then be used to determine the coordinates of the structure points in space. A multiplicity of imaging beam paths which pass through the right and/or left spectacle lens and which reach the respective known structure point after refraction through the right and/or left spectacle lens can be determined from these coordinates in space and the recordings of the structure points which were observed through the left and/or right spectacle lens by the at least one recording unit. This ray model spanned thus is typically used to ascertain the dioptric power or the local refractive power or the refractive power distribution of the left and/or right spectacle lens.

In the case of a regular pattern, the periodicity thereof is also captured by recording the scene. In the case of a further embodiment of the disclosure, the local focal power of the right and/or left spectacle lens can be deduced in a further embodiment of the disclosure from the interpretation of the local direction-dependent magnification or the local direction-dependent reduction of the pattern through at least the right and/or left spectacle lens. Pursuant to DIN EN ISO 13666:2013-10, paragraph 9.2, the focal power is the general term comprising the spherical and astigmatic power of a spectacle lens. Consequently, the local focal power can be determined, for example, in targeted fashion at the distance visual point and/or near visual point. Alternatively, the refractive power distribution of the spectacle lens can be deduced by determining the local focal power of the plurality of locations on the spectacle lens.

In a further aspect, the above-described method can be used together with at least one further method. The at least one further method can be for example a method for determining a refractive error of a user's eye, typically a method in accordance with EP 3730037 A1, wherein the method comprises the following steps:
 a) representing a character on a screen, wherein a parameter of the character represented on the screen is varied;
 b) capturing an eye movement metric of the user's eye depending on the character represented on the screen; and
 c) establishing a point in time at which a recognition threshold of the user for the character represented on the screen is evident from the eye movement metric of the user's eye; and
 d) determining a value for the refractive error of the user's eye from the parameter defined at the point in time.

As an alternative or in addition to the method described above, the at least one further method can for example also be a method for determining at least one optical parameter of a spectacle lens, typically a method in accordance with the European patent application with the application file reference EP 3730037 A1, wherein this method comprises the following steps:
 a) recording an image using a spectacle lens; and
 b) ascertaining at least one optical parameter of the spectacle lens by means of image processing of the image, wherein the image comprises an eye area including the eyes and/or a facial area adjoining the eyes, of a user of the spectacle lens.

As an alternative or in addition to the methods described above, the at least one additional method can also be a method for determining a refractive error of an eye of a user, typically a method in accordance with the European patent application with the application file reference EP 3730036 A1, wherein this method comprises the following steps:
 a) representing a character on a screen, wherein a parameter of the character represented on the screen is varied;
 b) capturing a reaction of the user depending on the character represented on the screen;
 c) establishing a point in time at which a recognizability of the character represented on the screen for the user is evident from the reaction of the user; and
 d) determining a value for the refractive error of the user's eye from the parameter defined at the point in time, wherein the character represented on the screen is a periodic pattern, wherein the parameter of the pattern represented on the screen comprises at least one spatial frequency, and the value for the refractive error is determined from the spatial frequency of the pattern defined at the point in time.

As an alternative or in addition to the methods described above, a method for determining the refractive power distribution of a spectacle lens is also possible as at least one additional method, typically a method in accordance with the European patent application EP 3730918 A1, which makes possible a local refractive power from the size and/or shape comparison of the imaging of the front eye section for a specific viewing direction. This is done by carrying out at least one recording of the front eye section with and without a spectacle lens situated in front of the latter, and respectively comparing the recording with and without a spectacle lens with one another.

In a superordinate application, the various methods described above, i.e., the method according to the disclosure and also the at least one further method, can be combined in order, from a comparison of the results respectively obtained, for example, to obtain a higher accuracy or a plausibility check of the results obtained in the individual methods. The various methods described above can be effected successively or simultaneously in the superordinate application. If the various methods are effected successively, their order can be independent of one another and/or any desired order can be involved. If the various methods are effected successively, preference may be given to carrying out at least one of the methods according to the disclosure for determining the refractive power distribution last. A superordinate application can be for example a computer program comprising the various methods.

BRIEF DESCRIPTION OF THE DRAWINGS

The disclosure will now be described with reference to the drawings wherein.

DESCRIPTION OF EXEMPLARY EMBODIMENTS

Figure 1:
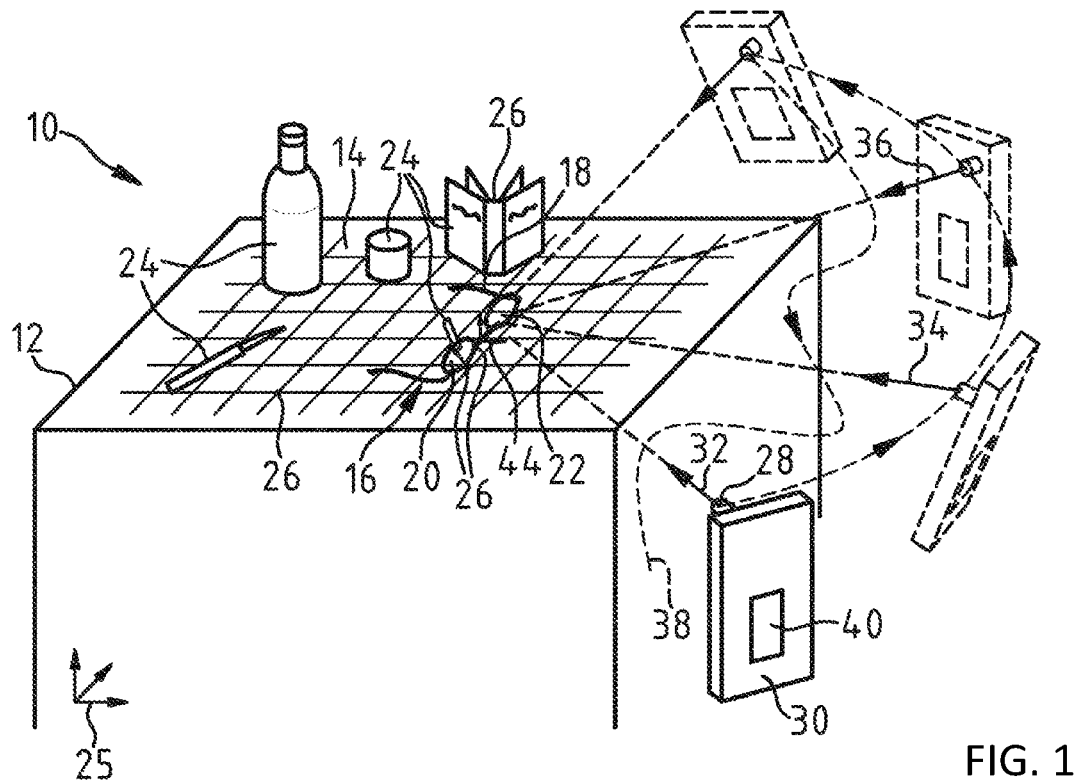
FIG. 1 shows a scene with a spectacle frame and with an image capture device arranged in different recording positions.

As a scene 10, FIG. 1 shows a table 12 with a tablecloth 14, arranged on which there is a pair of spectacles 16 with a spectacle frame 18 and a left and right spectacle lens 20, 22 received therein in addition to further objects 24 in the form of a knife, a bottle, a cup and a book, as well as a cigar. The scene 10 shown in FIG. 1 is time-invariant and contains characteristic points of a pattern of the tablecloth 14 and of the objects 24, which define a coordinate system 25 of the scene 10, and characteristic points of the spectacle frame 18 of the pair of spectacles 16 as structure points 26.

To measure the local refractive power of the left and the right spectacle lens 20, 22 in the pair of spectacles 16, the scene 10 is recorded by means of the camera 28 in an image capture device 30 embodied as a smartphone in a multiplicity of different recording positions 32, 34, 36, . . . by virtue of a user holding the smartphone switched into the video mode with one hand and displacing the smartphone along a trajectory 38. Hence, the user captures the scene 10 by means of the camera 28 of the image capture device 30 from different perspectives. To process the recordings of the scene 10 captured by means of the camera 28, the image capture device 30 contains a computer unit 40.

Figure 2:
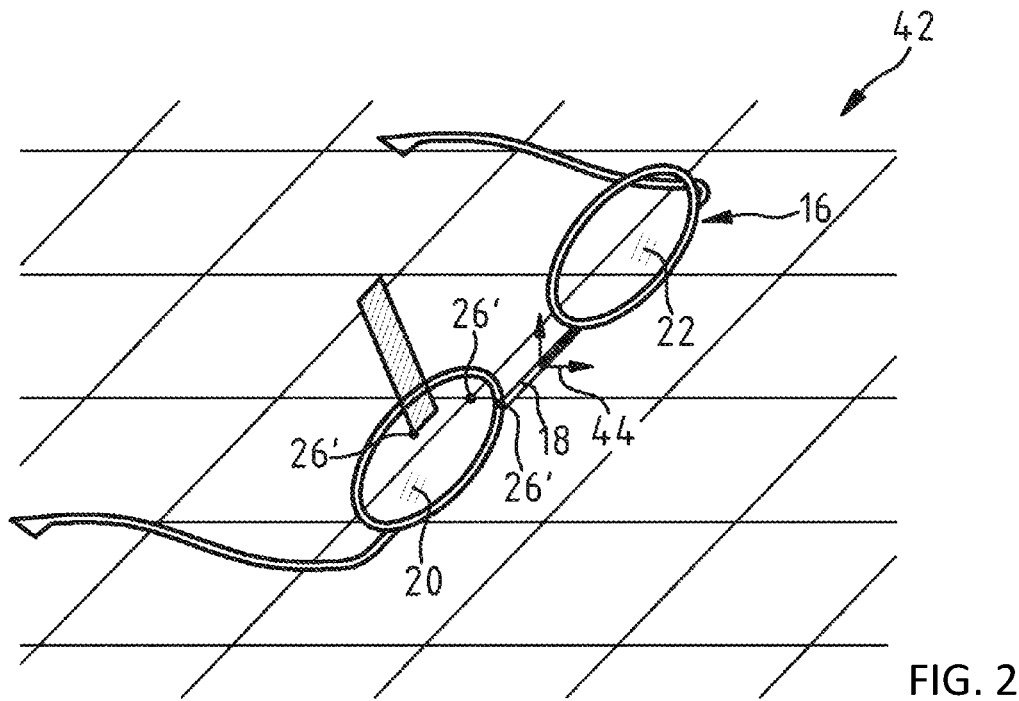
FIG. 2 shows a portion of a first image representation of the scene captured by means of the image capture device in a first recording position.
Figure 3:
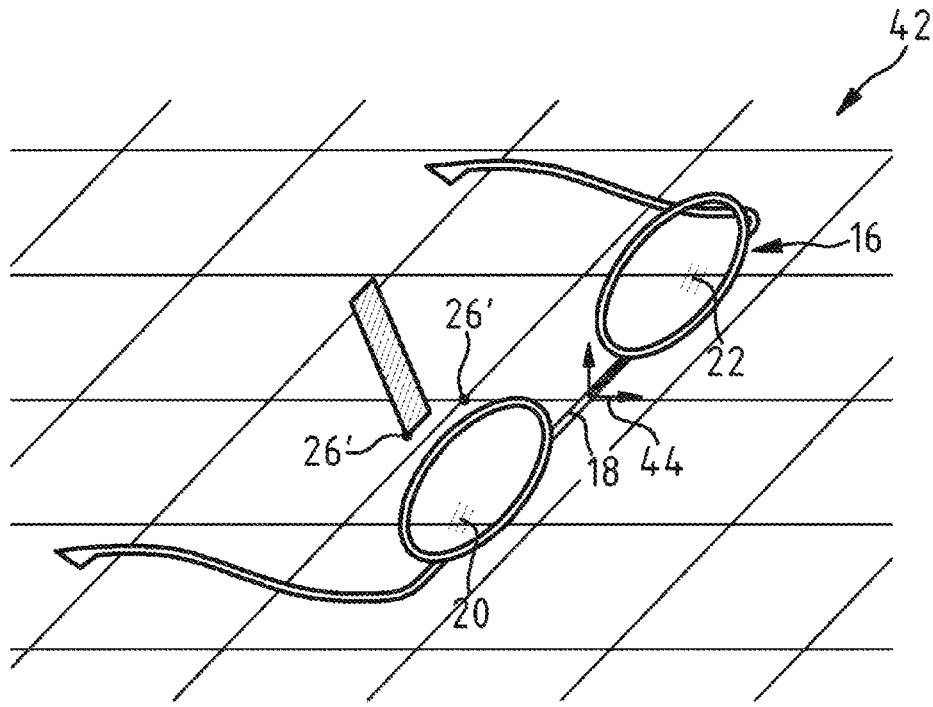
FIG. 3 shows a portion of a second image representation of the scene captured by means of the image capture device in a further recording position that differs from the first recording position.

FIG. 2 shows a portion 42 of a first image representation of the scene 10 with image representations 26' of structure points 26, captured by means of the image capture device 30 from a first recording position 32. FIG. 3 shows a further portion 42 of a first image representation of the scene 10 with image representations 26' of structure points 26, captured by means of the image capture device 30 from a further recording position 36 that differs from first recording position 32.

When displacing the image capture device 30 relative to the scene 10, a multiplicity of structure points 26 are each captured by means of an imaging beam path which passes through or does not pass through the first and/or the second spectacle lens 20, 22 in the spectacle frame 18 of the pair of spectacles 16, as is evident from FIG. 2 and FIG. 3.

Moreover, when displacing the image capture device 30 relative to the scene 10, image representations of the scene 10 which contain a section of the spectacle frame 18 that defines a coordinate system 44 of the spectacle frame 18 are captured.

Figure 4:
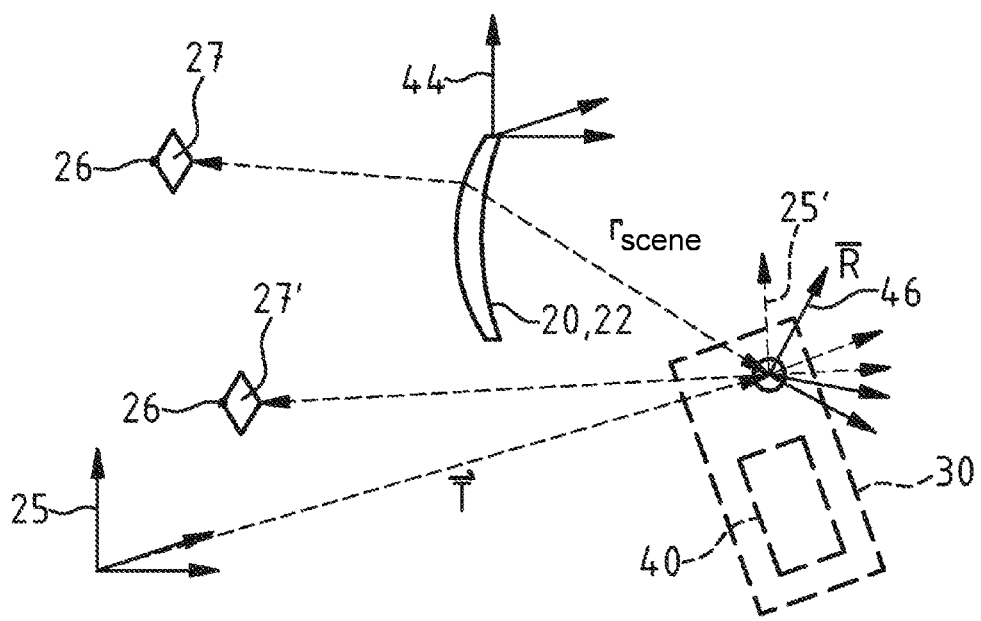
FIG. 4 shows a coordinate system of the scene and a coordinate system of the image capture device with a spectacle lens.

FIG. 4 shows the coordinate system 25 of the scene 10 and a coordinate system 46 of the image capture device 39 with a spectacle lens 20, 22. From the many captured image representations of the scene 10, the computer unit 40 in the image capture device 30 calculates the coordinates of the structure points 26 of a pattern 27 in the scene on the basis of a SLAM algorithm and by means of a ray model in a coordinate system 46, which is referenced to the image capture device 30 and which in turn is referenced to the coordinate system 25 of the scene 10 and the coordinate system 44 of the spectacle frame 18 of the pair of spectacles 16.

Figure 5:
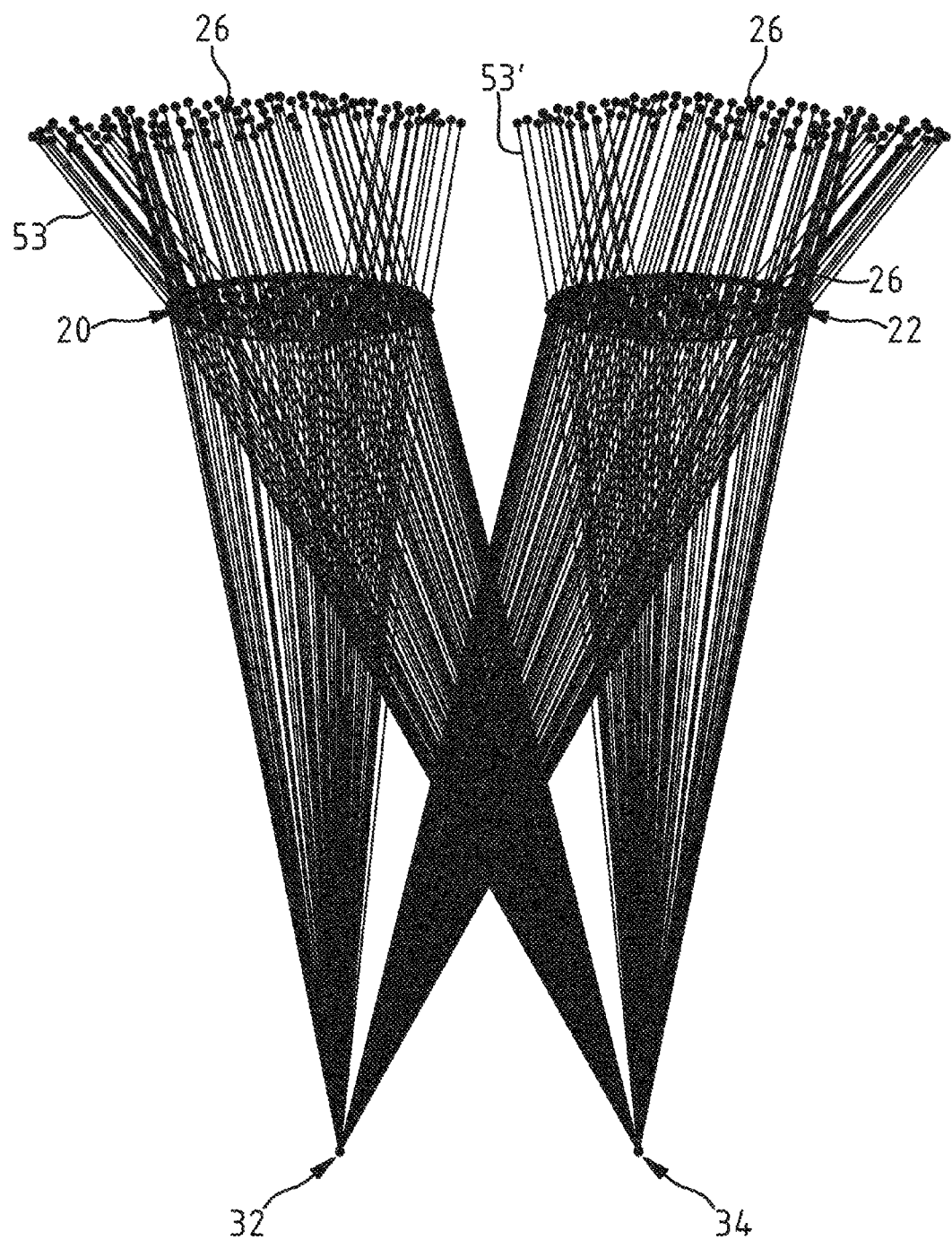
FIG. 5 shows a ray model of a spectacle frame when observing the scene from two different perspectives.

FIG. 5 shows a ray model of the pair of spectacles 16 with imaging beam paths which are guided into the camera 28 of the image capture device 30 and which contain chief rays 53, 53' for structure points 26 when the scene 10 is captured from two different recording positions 32, 34. Not only does such a ray model require knowledge about the positions of the image capture device 30, it also assumes a three-dimensional model for the scene 10 and knowledge of the position of the pair of spectacles 16, shown in FIG. 1, in the scene 10 and moreover information about which structure points 26 in the scene 10 are captured by the image capture device 30 through the left spectacle lens 20 or the right spectacle lens 22 of the pair of spectacles 16.

To calculate the ray model shown in FIG. 5, the following procedure is carried out, with reference being made to FIG. 4:

From the pixel coordinate in homogeneous coordinates $$C = \begin{pmatrix} C_x \\ C_y \\ 1 \end{pmatrix}$$

of a structure point 26 of a pattern 27 in the scene 10, as imaged in the camera 28 of the image capture devices 30, a chief ray of an imaging beam path incident in the camera optical unit is determined in the form of a three-dimensional vector in the coordinate system 46 of the image capture device of the camera 28

$$\vec{r}_0 = \overline{K}^{-1} \cdot C$$

where $$\overline{K} = \begin{pmatrix} K_{11} & K_{12} & K_{13} \\ K_{21} & K_{22} & K_{23} \\ K_{31} & K_{32} & K_{33} \end{pmatrix}$$

if a camera calibration operator $\overline{K}$ is known. From the known spatial position of the camera 28 and its relative spatial position in the coordinate system 25, it is possible to determine the translation operator $$\vec{T}$$

and the rotation operator $$\overline{R} = \begin{pmatrix} R_{11} & R_{12} & R_{13} \\ R_{21} & R_{22} & R_{23} \\ R_{31} & R_{32} & R_{33} \end{pmatrix}$$

where $det\overline{R}=1$.

From these, $\vec{r}_0$ is converted by a linear transformation $\vec{r}_{scene} = \overline{R}^T \cdot (\vec{r}_0 - \vec{T})$ from the coordinate system 46 of the image capture device of the camera 28 into the coordinate system 25' by way of a rotation corresponding to the rotation operator $\overline{R}$ and then into the coordinate system 25 of the scene 10 by way of a translation corresponding to the translation operator $\vec{T}$.

By detecting and tracking stationary, time-invariant structure points 26, whose imaging beam paths do not run through the spectacle lenses, over a plurality of recordings of different recording positions 32, 34, 36 by means of feature matching algorithms, it is possible to deduce the relative position in the scene 10 in the coordinate system 46 of the image capture device 30 for each of these structure points 26 from the intrinsic parameters of the image capture device and the relative position and absolute position of an image capture device at the time of capture of an image representation.

Then, a chief ray 53, 53' which passes through a spectacle lens 20, 22 of the pair of spectacles 16 is calculated from each imaged structure point 26 in accordance with the position of the image capture device 30. This and the 3-D coordinate of the point then yields a beam model which reflects different viewing conditions of the same pair of spectacles 16 in the same scene 10 and which describes imaging rays, which are deflected and correspond to the various relative positions and absolute positions of an image capture device.

By way of a so-called inverted approach, as described in, for example, the publication by K. N. Kutulakos and E. Steger, A Theory of Refractive and specular 3D Shape by Light-Path Triangulation, International Journals of Computer Vision, 2008, volume 76, issue 1, pages 13 to 29 the entirety of which is referenced herewith and the disclosure of which is incorporated into the description of this disclosure, it is then possible to determine both the absolute position and the shape and relative position, and the refractive index of the material of the left and right spectacle lens 20, 22 in the spectacle frame 18 of the pair of spectacles 16 from this data record and hence also possible to determine the optical power thereof for a spectacle wearer.

An inverted approach is a reversal of the so-called forward calculation, in which an optical ray calculation, which is also referred to as ray tracing, is used to calculate the course of light rays through an optical system consisting of known optical interfaces and known refractive indices between the interfaces. Provided that the interfaces, the normals thereof and the refractive indices are known, this allows each light ray through the system to be calculated uniquely. In the case of the inverted approach, an optical interface or refractive index which fits to a given number of light rays is sought after. To determine an error dimension, the forward calculation is carried out on the basis of the surface determined by means of the inverted approach and a comparison is then made between points on the ray upstream and/or downstream of the respective interface. By varying the surface to be determined, the error dimension is then minimized in a targeted fashion by means of an optimization method. As an alternative to pure optimization methods which can ascertain the minimum of an error function by parameter variations, it is also possible to use so-called light path triangulation methods here, which are also used in combination with an optimization method. Such methods have been described, for example, in the aforementioned publication by K. N. Kutulakos and E. Steger, "A Theory of Refractive and specular 3D Shape by Light-Path Triangulation," University of Toronto.

If the shape and refractive index of spectacle lenses are known, the dioptric power thereof can be calculated in particular by a forward calculation of beams. By way of example, the vertex power of a spectacle lens can be determined by virtue of propagating a parallel beam with a diameter of approximately 5 mm, which thus corresponds to the size of the pupil of the eye, through the spectacle lens in such a way that the chief ray thereof, i.e., the optical axis thereof, leaves the spectacle lens in perpendicular fashion on the eye side. The value of the vertex power then is the inverse of the distance between the spectacle lens surface, from which the chief ray emerges, and the point of smallest beam waist or extent of the beam.

In the case of spectacle lenses comprising at least one toric power, the directionally dependent extent of the beam has two minima. The distance between these two minima and the surface of the spectacle lens describes the power of the two principal meridians. The difference between these two principal meridians describes the cylindrical power of the spectacle lens. The overall deflection of the principal ray through the spectacle lens should be considered to be the prismatic effect of the spectacle lens at the respective location.

The so-called intrinsic camera calibration operator $\overline{K}$ serves to convert pixel coordinates C of the camera 28 in the image capture device 30 to the beam vector of an imaging beam path. The camera calibration operator $\overline{K}$ can be determined, for example, from a recording of a specific calibration pattern, for example a checkerboard pattern or point pattern, by means of the image capture device. As an alternative thereto, it is also possible to determine the intrinsic camera calibration operator $\overline{K}$ by evaluating a multiplicity of recordings or image representations of the scene 10 directly from the recordings or image representations of the scene 10 which are based on different recording positions 32, 34, 36.

Figure 6:
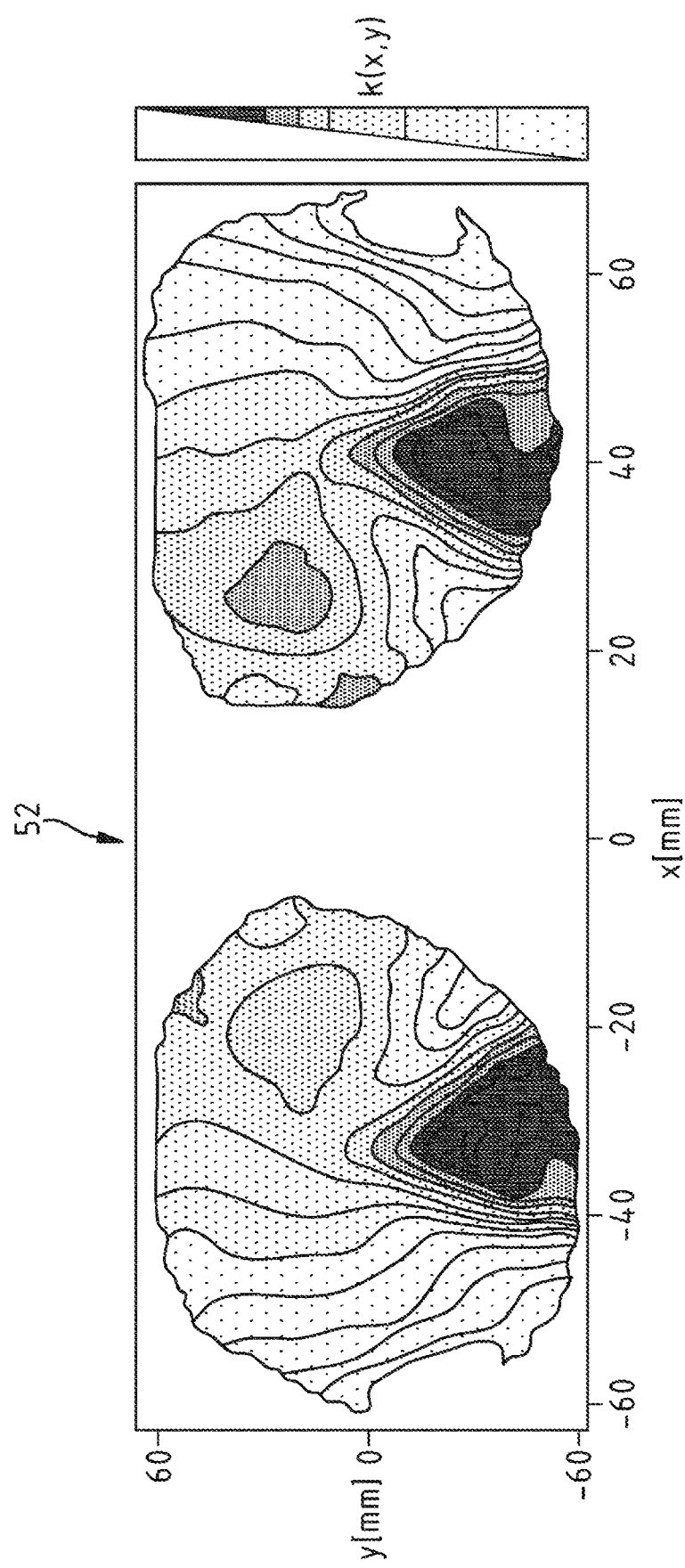
FIG. 6 shows a refractive power distribution calculated from the ray model of the spectacle frame.

FIG. 6 shows a graph 52 relating to a distribution of the refractive power k(x,y) for the left and right spectacle lens 20, 22, which is calculated on the basis of the ray model of the pair of spectacles 16 shown in FIG. 5.

Figure 7:
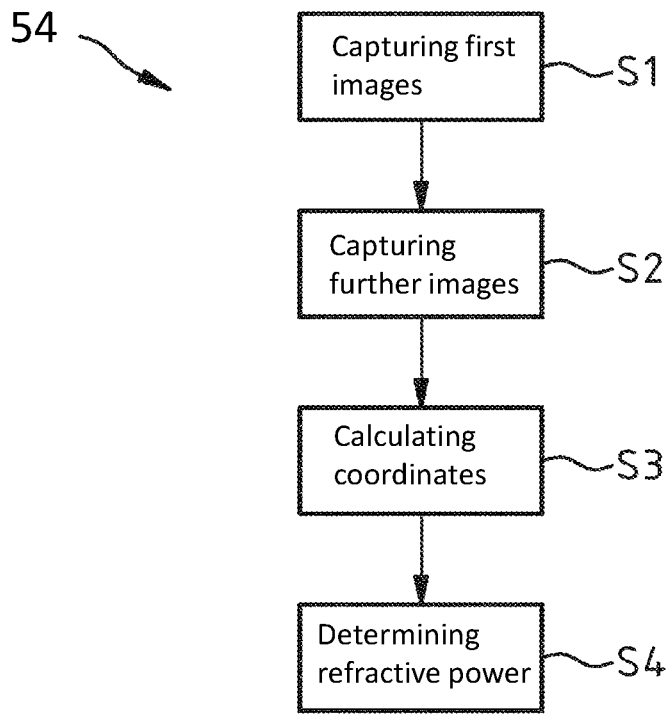
FIG. 7 shows a flowchart of a configuration of a method for measuring a left and/or right spectacle lens in a spectacle frame.

FIG. 7 shows a flowchart 54 of the above-described method for measuring a left and/or right spectacle lens 20, 22 in a pair spectacles 16.

In a first step S1, at least one first image representation of a scene 10 with a multiplicity of structure points 26 and with a left and/or a right spectacle lens 20, 22 in a pair of spectacles 16 and with a portion of the spectacle frame 18 of the pair of spectacles 16 which defines a coordinate system 44 of the spectacle frame 18 of the pair of spectacles 16 is captured by means of an image capture device 30 with an imaging beam path for structure points 26 which passes through the first and/or the second spectacle lens 20, 22 of the pair of spectacles 16.

In a step S2, which follows step S1, at least two further image representations of the scene 10 are then captured by the image capture device 30, without the first and/or the second spectacle lens 20, 22 of the pair of spectacles 16 but with the structure points 26 imaged in the first image representation.

Then, in a step S3, the coordinates of the stationary, time-invariant structure points 26 are calculated in the coordinate system 25 of the scene 10, which is referenced to the coordinate system 46 of the image capture device 30 in the various recording positions, from the at least two further image representations of the scene 10 by means of an image evaluation.

In a step S4, which follows step S3, the refractive power distribution k(x,y) is then determined for at least one section of the left spectacle lens 20 in the coordinate system 44 of the spectacle frame 18 which is referenced to the coordinate system 25 of the scene 10 and/or the refractive power distribution k(x,y) is determined for at least one section of the right spectacle lens 22 in a coordinate system 25 of the scene 10 which is referenced to the coordinate system 44 of the spectacle frame 18 from the coordinates of the stationary, time-invariant structure points 26 and the image of the structure points 26 in the at least one image representation of the scene 10.

Figure 8:
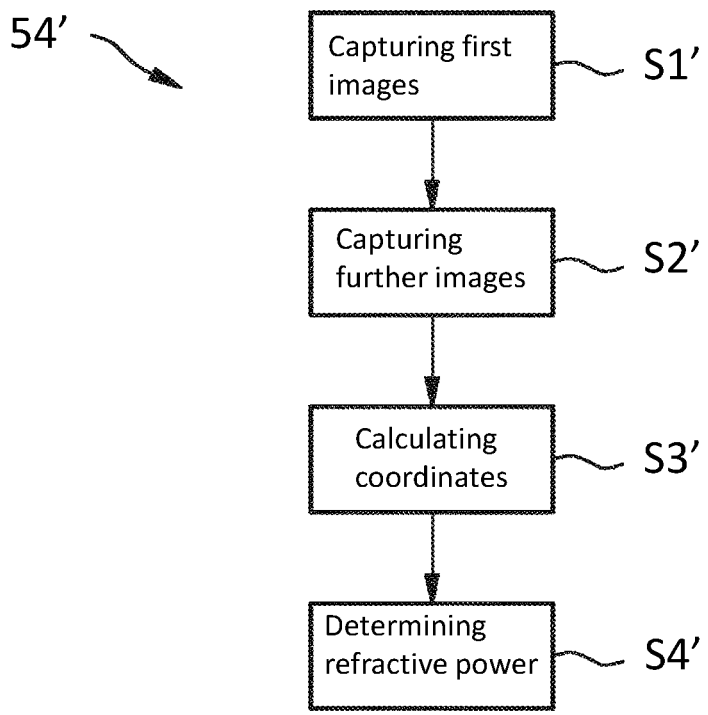
FIG. 8 shows a flowchart of a further configuration of a method for measuring a left and/or right spectacle lens in a spectacle frame.

FIG. 8 shows a flowchart 54' for a method which is an alternative to the above-described method for measuring a left and/or right spectacle lens 20, 22 in a pair of spectacles 16 and which is described below with reference to FIG. 9 to FIG. 12.

Figure 9:
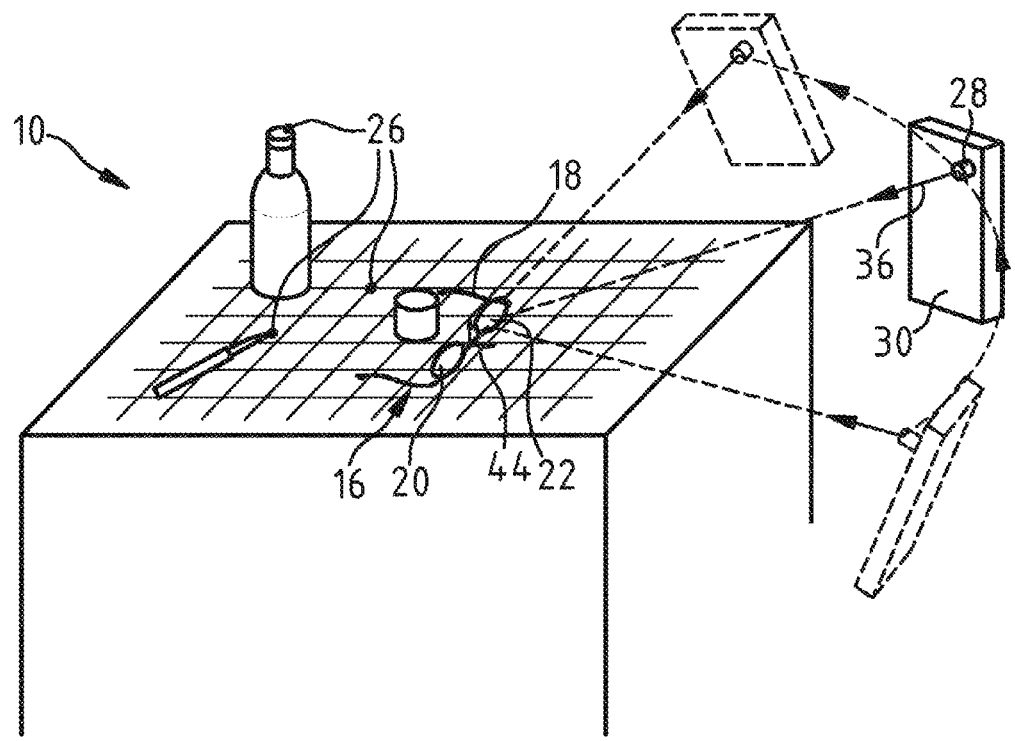
FIG. 9 shows a further scene with a spectacle frame and with an image capture device arranged in different recording positions.

Here, too, a sequence of first image representations of a time-invariant scene 10 with a multiplicity of structure points 26 and with a left and/or a right spectacle lens 20, 22 in a pair of spectacles and 16 is once again captured in a first step S1', as is evident from FIG. 9, by means of an image capture device 30, together with a section of the spectacle frame 18 which defines a coordinate system 44 of the spectacle frame 18 as shown in FIG. 4.

As is evident from FIG. 9, the image representations of the scene 10 are captured in this case with imaging beam paths for structure points 26, at least some of which pass through the first and/or the second spectacle lens 20, 22 of the pair of spectacles 16 and/or at least some of which are guided past the first and/or the second spectacle lens 20, 22 of the pair of spectacles 16.

Figure 10:
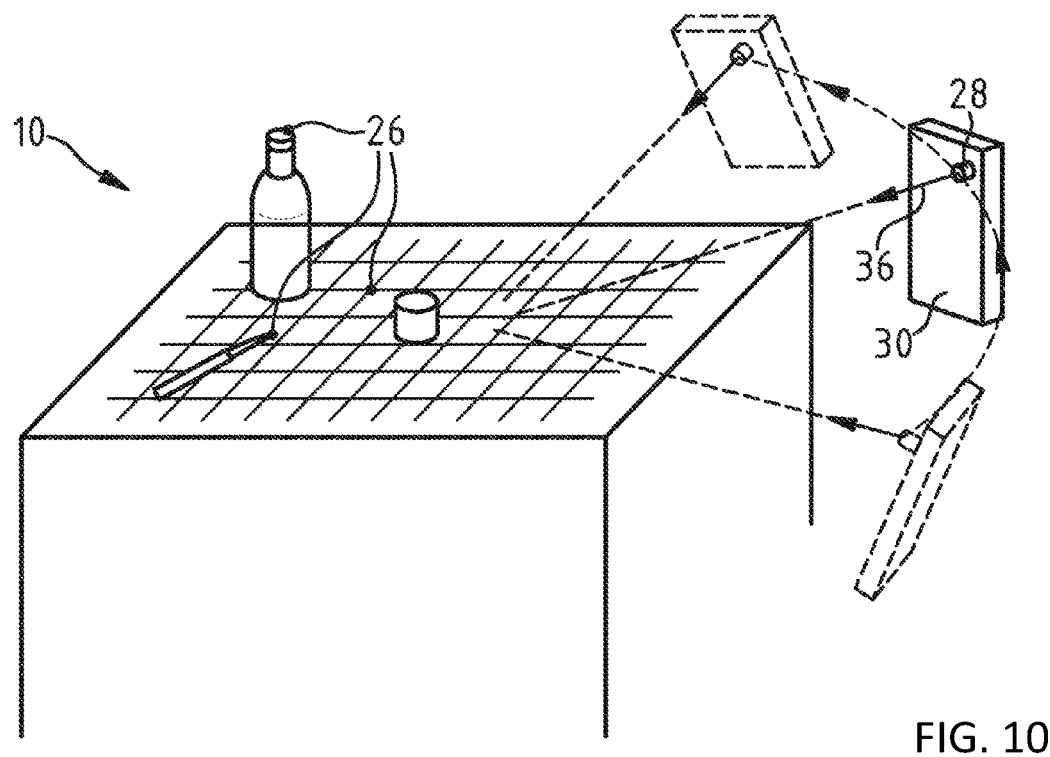
FIG. 10 shows a further scene without the spectacle frame but with the image capture device.

In a step S2' which follows step S1', a sequence of further image representations of the scene 10 with stationary time-invariant structure points 26 but without the pair of spectacles 16 is captured, as is evident from FIG. 10. What should be observed here is that step S2' can also precede step S1' or can be carried out at the same time as the latter.

In a step S3', the coordinate system 25 of the scene 10 is referenced to the coordinate system 44 of the spectacle frame 18 and then the coordinates of the structure points 26 are calculated in the coordinate system 25 of the scene 10, which is referenced to the coordinate system 46 of the image capture device 30 in the various recording positions, from the at least one further image representation of the scene 10 by means of an image evaluation.

Subsequently, in a step S4', the refractive power distribution k(x,y) is determined for at least one section of the left spectacle lens 20 in the coordinate system 44 of the spectacle frame 18 which is referenced to the coordinate system 25 of the scene 10 and/or the refractive power distribution k(x,y) is determined for at least one section of the right spectacle lens 22 in the coordinate system 44 of the spectacle frame 18 from the coordinates of the structure points 26 and the image of the structure points 26 in the at least one first image representation of the scene 10.

Figure 11:
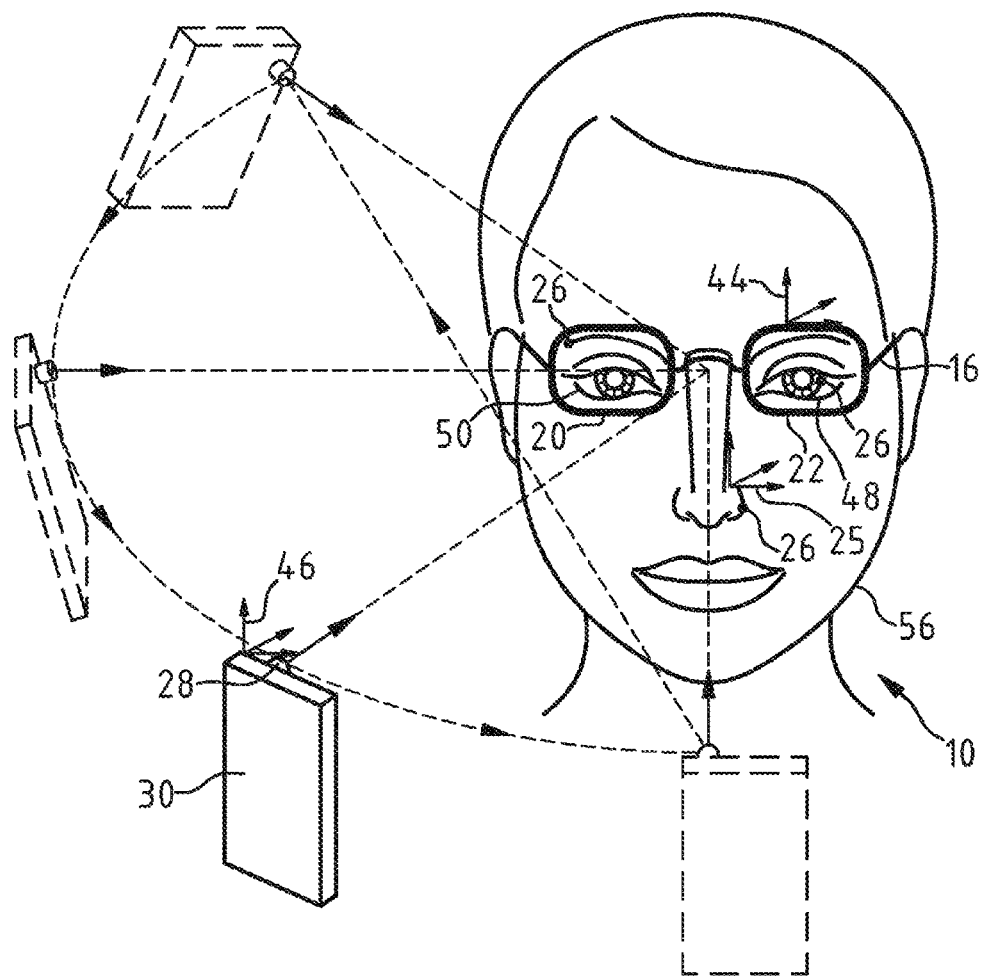
FIG. 11 shows a further scene with a spectacle frame and with an image capture device arranged in different recording positions.
Figure 12:
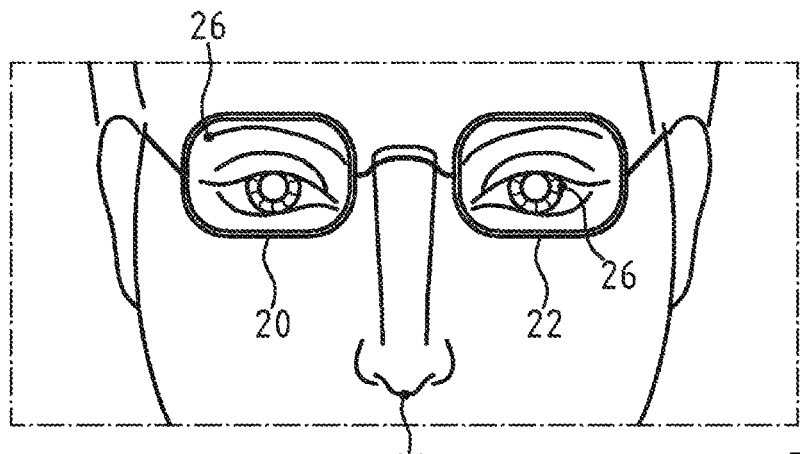
FIG. 12 shows a portion of the image representation of the scene captured by means of the image capture device in the first recording position.

As is evident from FIG. 11 to FIG. 14, the measurement of a left and/or right spectacle lens 20, 22 in a spectacle frame 18 can also be implemented by capturing image representations of one scene 10, which contains a spectacle wearer with a pair of spectacles and without a pair of spectacles. Here, a sequence of first image representations of a time-invariant scene 10 with a multiplicity of structure points 26 and with a left and/or a right spectacle lens 20, 22 in a spectacle frame 18 is captured, as is evident from FIG. 11, by means of an image capture device 30, together with a section of the spectacle frame 18 which defines a coordinate system 44 of the spectacle frame 18. As FIG. 12 shows, the image representations of the scene 10 are captured in this case with imaging beam paths for structure points 26, at least some of which pass through the first and/or the second spectacle lens 20, 22 of the pair of spectacles 16 and/or at least some of which are guided past the first and/or the second spectacle lens 20, 22 of the pair of spectacles 16.

Figure 13:
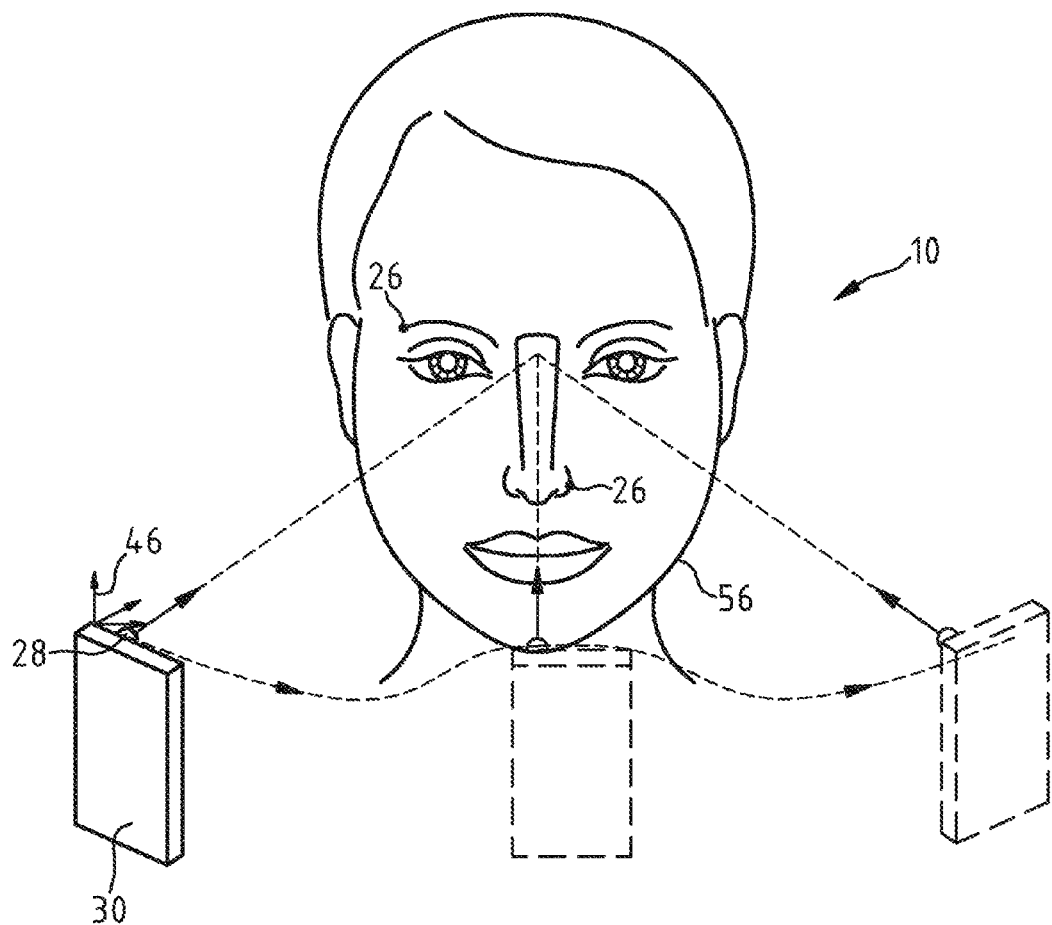
FIG. 13 shows a further scene without the spectacle frame but with the image capture device.
Figure 14:
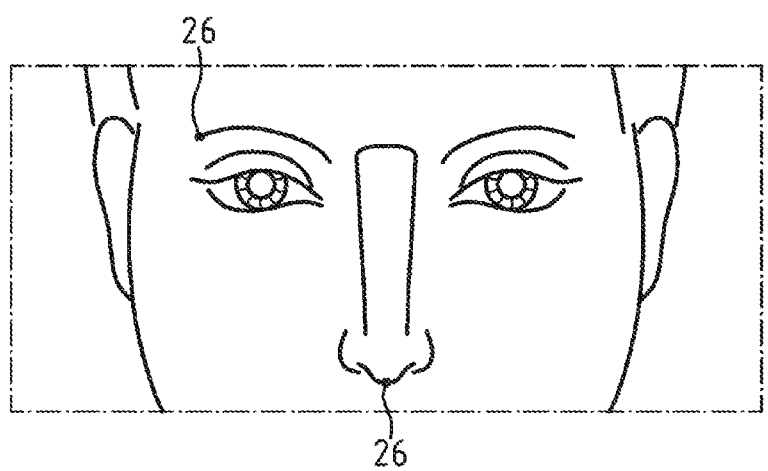
FIG. 14 shows a portion of the image representation of the scene without the spectacle frame captured by means of the image capture device.

Then, as shown by FIG. 13 and FIG. 14, a sequence of further image representations of the scene 10, with structure points 26 but without the pair of spectacles 16, is captured. Then, once again, the coordinates of the structure points 26 are calculated by means of image evaluation from the at least one further image representation of the scene 10 in a coordinate system 25 of the scene 10 which is referenced to the coordinate system 46 of the image capture device 30 in the various recording positions, and the coordinate system 25 of the scene 10 is referenced to the coordinate system 44 of the spectacle frame 18. Then, the refractive power distribution k(x,y) is determined for at least one section of the left spectacle lens 20 in the coordinate system 44 of the spectacle frame 18 and/or the refractive power distribution k(x,y) is determined for at least one section of the right spectacle lens 22 in the coordinate system 44 of the spectacle frame 18 from the coordinates of the structure points 26 and the image of the structure points 26 in the at least one first image representation of the scene 10.

Because structure points 26 in the scene 10 shown in FIG. 11 and FIG. 13 can be displaced on account of movements of the spectacle wearer, the computer unit of the image capture device 30 in this case contains a program routine by means of which the relative position of the structure points 26 is calculated by evaluating proximity relations, in particular distances between the structure points 26 in the scene, in a coordinate system 25 of the scene 10 which is referenced to the coordinate system 44 of the spectacle frame 18.

Provision can be made for the proximity relationships between the structure points 26 in the scene 10 to be evaluated in order to recognize a displacement of structure points 26 in a coordinate system 25 of the scene 10 and in order not to take account of the coordinates of structure points 26 that have been displaced in a scene 10 when determining the refractive power distribution for at least one section of the right spectacle lens 22 and the left spectacle lens 20 in the coordinate system 44 of the spectacle frame 18 so that movements of structure points 26 in the scene 10 do not falsify the measurement result for the local refractive power of the left and right spectacle lens 20, 22.

In summary, the following, in particular, should be noted: The disclosure relates to a method for measuring the local refractive power or the refractive power distribution of a left and/or a right spectacle lens 20, 22 in a spectacle frame 18. In the process, at least one first image representation of a scene 10 with at least one structure point 26 and with a left and/or a right spectacle lens 20, 22 in a spectacle frame 18 is captured by means of an image capture device 30 from at least one first recording position 32 with at least an imaging beam path for structure points 26, the imaging beam path passing through the first and/or the second spectacle lens 20, 22 in the spectacle frame 18. At least two further image representations of the scene 10 without the first and/or the second spectacle lens 20, 22 of the spectacle frame 18 or without the spectacle frame containing the left and/or the right spectacle lens but with the structure points 26 imaged in the first image representation are captured by means of the image capture device 30 from at least two different recording positions 32, 34, 36, one of which can be identical to the first recording position, and the coordinates of the structure points 26 are calculated in a coordinate system 25 from the at least two further image representations of the scene 10 by means of image evaluation, or at least two further image representations of the scene 10 with the left and/or the right spectacle lens 20, 22 are captured by means of an image capture device 30 from at least two further recording positions which differ from the first recording position and which have at least one imaging beam path for the structure points 26 that are imaged in the first image representation, the imaging beam path not passing through the first and/or the second spectacle lens 20, 22 of the spectacle frame 18, in order then to determine a refractive power distribution k(x,y) for at least one section of the left spectacle lens 20 in a coordinate system 25 of the scene 10 which is referenced to the coordinate system 44 of the spectacle frame 18 and/or a refractive power distribution k(x,y) for at least one section of the right spectacle lens 22 in a coordinate system 25 from the coordinates of the structure points 26 and the image of the structure points 26 in the at least one first image representation of the scene 10.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 Scene
12 Table
14 Tablecloth
16 Pair of spectacles
18 Spectacle frame
20 Left spectacle lens
22 Right spectacle lens
24 Objects
25 Coordinate system of the scene
25' Coordinate system of the scene following a translation
26 Structure point
26' Image representations of structure point
27 Pattern
28 Camera
30 Image capture device
32, 34, 36 Recording position
38 Trajectory
40 Computer unit
42 Section
44 Coordinate system of the frame
46 Coordinate system image capture device
48 Left eye
50 Right eye
52 Graph
53, 53' Chief ray
54, 54' Flowchart
C Pixel coordinate
$\bar{K}$ Camera calibration operator
$\bar{R}$ Rotation operator
$\vec{T}$ Translation operator
S1, S2, S3, S4 Steps
S1', S2', S3', S4' Steps
k(x,y) Local refractive power or refractive power distribution

The invention claimed is:

1. A method for measuring a local refractive power of a left and/or a right spectacle lens in a spectacle frame, the method comprising:
   capturing at least one first image representation of a scene with at least one structure point and with the left and/or the right spectacle lens in the spectacle frame with at least one image capture device from at least one first recording position having at least one imaging beam path for the at least one structure point, the imaging beam path passing through the left or the right spectacle lens;
   capturing at least two further image representations of the scene with the at least one structure point imaged in the at least one first image representation with the at least one image capture device, wherein the at least two further image representations are captured:
      without the left and/or the right spectacle lens of the spectacle frame from at least two different recording positions, one of which can be identical to the first recording position, or
      with the left and/or the right spectacle lens in the spectacle frame from at least two different further recording positions, which differ from the first recording position, wherein the respective imaging beam path for the at least one structure point captured in the at least one first image representation does not pass through the left and the right spectacle lens of the spectacle frame,
   wherein in the at least one first image representation of the scene a section of the spectacle frame of the pair of spectacles is captured, the section defining a coordinate system of the spectacle frame of the pair of spectacles;
   calculating coordinates of the at least one structure point in a coordinate system, which is referenced to the coordinate system of the spectacle frame, from the at least two further image representations of the scene by image evaluation;
   calculating an absolute position, a relative position, and a boundary of the spectacle frame with the image evaluation; and
   determining the local refractive power for at least one section of the left spectacle lens and/or for at least one section of the right spectacle lens with a ray model with imaging beam paths passing through the left and/or right spectacle lens, which reach the at least one structure point after refraction by the left and/or right spectacle lens, from the coordinates of the at least one structure point and a chief ray, which passes through the left or right spectacle lens and which is calculated for the image of the at least one structure point in the at least one first image representation of the scene corresponding to the respective position of the at least one image capture device.

2. The method as claimed in claim 1, wherein the image evaluation is implemented by an object recognition method.

3. The method as claimed in claim 1, further comprising capturing a multiplicity of first image representations of the scene and a multiplicity of further image representations of the scene, wherein the coordinates of the at least one structure point in the coordinate system which is referenced to the coordinate system of the spectacle frame are calculated from the multiplicity of further image representations of the scene.

4. The method as claimed in claim 1, wherein the scene contains a left eye and/or right eye of a spectacle wearer of the spectacle frame.

5. The method as claimed in claim 4, wherein the image capture device captures a multiplicity of image representations of the scene with a displacement of the image capture device, wherein the left eye and/or the right eye of the wearer of the spectacle frame gazes at the displaced image capture device, wherein respective viewing beam paths for different viewing directions of the left eye and/or right eye of the wearer of the spectacle frame through the left spectacle lens and/or the right spectacle lens of the spectacle frame are calculated from the multiplicity of image representations of the scene, and wherein the local refractive power of the left spectacle lens and/or the right spectacle lens is determined for each viewing direction therethrough.

6. The method as claimed in claim 1, wherein intrinsic parameters of the at least one image capture device are calculated with a Simultaneous Localization and Mapping (SLAM) algorithm.

7. The method as claimed in claim 6, wherein the intrinsic parameters are selected from the group of a focal length, an image center, shearing parameters, scaling parameters, and distortion parameters.

8. The method as claimed in claim 1, wherein a SLAM algorithm is used to calculate the coordinates of the at least one structure point and/or the recording positions of the at least one image capture device in the coordinate system, which is referenced to the coordinate system of the spectacle frame.

9. The method as claimed in claim 1, wherein the coordinates of at least some of the structure points in the scene are invariant.

10. The method as claimed in claim 1, wherein the coordinates of at least one structure point are calculated in a coordinate system, which is referenced to the coordinate system of the spectacle frame, by evaluating displacements between the image representations of the structure points in the scene from different recording positions.

11. The method as claimed in claim 1, wherein a displacement of the structure points in the coordinate system is recognized by evaluating proximity relations between the structure points in the scene, and wherein the coordinates of structure points displaced in the scene are not taken into account when determining the refractive power distribution for the at least one section of the right spectacle lens and/or the left spectacle lens.

12. A method for measuring a refractive power distribution of a left and/or a right spectacle lens in a spectacle frame, wherein the local refractive power of the left and/or right spectacle lens is measured according to the method as claimed in claim 1 at a plurality of different locations on the left and/or right spectacle lens.

13. A non-transitory computer program product comprising a computer program having program code for carrying out the method as claimed in claim 1 when the computer program is loaded on a computer unit and/or executed on the computer unit.

14. A portable non-transitory computer-readable data medium, on which the computer program as claimed in claim 13 is stored.

15. An apparatus for measuring the local refractive power of a left and/or a right spectacle lens in a spectacle frame, the apparatus comprising:
   an image capture device; and
   a computer unit, loaded onto which is a computer program with program code, the computer unit being configured to execute the method according to claim 1,
   wherein the computer unit is further configured to optionally measure the refractive power distribution of the left and/or the right spectacle lens in the spectacle frame by measuring the local refractive power at a plurality of different locations on the left and/or right spectacle lens.

16. The apparatus as claimed in claim 15, wherein the apparatus is configured as a smartphone, a tablet computer, or as a camera.

17. A method for measuring a local refractive power of a left and/or a right spectacle lens in a spectacle frame, the method comprising:
   capturing at least two first image representation of a scene with at least one structure point and with the left and/or the right spectacle lens in the spectacle frame with at least one image capture device from at least two recording positions respectively having at least one imaging beam path for the at least one structure point, the respective imaging beam paths passing through the left or the right spectacle lens;
   capturing at least two further image representations of the scene with the at least one structure point imaged in the at least two first image representations with the at least one image capture device from at least two different recording positions without the spectacle frame containing the left and/or the right spectacle lens,
   wherein in the at least two first image representations of the scene a section of the spectacle frame of the pair of spectacles is captured, the section defining a coordinate system of the spectacle frame of the pair of spectacles;
   calculating coordinates of the at least one structure point in a coordinate system, which is referenced to the coordinate system of the spectacle frame, from the at least two further image representations of the scene with image evaluation;
   calculating an absolute position, a relative position, and a boundary of the spectacle frame with the image evaluation; and
   determining the local refractive power for at least one section of the left spectacle lens and/or for at least one section of the right spectacle lens with a ray model with imaging beam paths passing through the left and/or right spectacle lens, which reach the at least one structure point after refraction by the left and/or right spectacle lens, from the coordinates of the at least one structure point and a chief ray, which passes through the left or right spectacle lens and which is calculated for the image of the at least one structure point in at least one of the first image representations of the scene corresponding to the respective position of the at least one image capture device.

18. A method for measuring a local refractive power of a left and/or a right spectacle lens in a spectacle frame, the method comprising:

capturing at least one first image representation of a scene having a plurality of structure points and the left and/or the right spectacle lens in the spectacle frame with at least one image capture device from at least one first recording position having at least one imaging beam path for each of the plurality of structure points, the imaging beam path passing through the left and/or the right spectacle lens, capturing at least two further image representations of the scene without the left and/or the right spectacle lens of the spectacle frame or without the spectacle frame containing the left and/or the right spectacle lens but with the plurality of structure points imaged in the first image representation with the at least one image capture device from at least two different recording positions, one of which can be identical to the first recording position;

calculating coordinates of the plurality of structure points in a coordinate system from the at least two further image representations of the scene by image evaluation; and determining the local refractive power for at least one section of the left spectacle lens and/or for at least one section of the right spectacle lens from the coordinates of the plurality of structure points and the image of the structure points in the at least one first image representation of the scene with an inverted approach, in which an optical interfaces and/or the refractive index of the left and/or right spectacle lens are calculated from the imaging beam paths for the structure points.

19. The method as claimed in claim 18, wherein the image evaluation is implemented by triangulation.

20. The method as claimed in claim 18, further comprising capturing a multiplicity of first image representations of the scene and a multiplicity of further image representations of the scene, wherein the coordinates of the at least one structure point in the coordinate system which is referenced to the coordinate system of the spectacle frame are calculated from the multiplicity of further image representations of the scene.

21. The method as claimed in claim 18, wherein the scene contains a left eye and/or right eye of a spectacle wearer of the spectacle frame.

22. The method as claimed in claim 21, wherein the image capture device captures a multiplicity of image representations of the scene with a displacement of the image capture device, wherein the left eye and/or the right eye of the wearer of the spectacle frame gazes at the displaced image capture device, wherein respective viewing beam paths for different viewing directions of the left eye and/or right eye of the wearer of the spectacle frame through the left spectacle lens and/or the right spectacle lens of the spectacle frame are calculated from the multiplicity of image representations of the scene, and wherein the local refractive power of the left spectacle lens and/or the right spectacle lens is determined for each viewing direction therethrough.

23. The method as claimed in claim 18, wherein intrinsic parameters of the at least one image capture device are calculated with a SLAM algorithm.

24. The method as claimed in claim 23, wherein the intrinsic parameters are selected from the group of a focal length, an image center, shearing parameters, scaling parameters, and distortion parameters.

25. The method as claimed in claim 18, wherein a SLAM algorithm is used to calculate the coordinates of the at least one structure point and/or the recording positions of the at least one image capture device in the coordinate system, which is referenced to the coordinate system of the spectacle frame.

26. The method as claimed in claim 18, wherein the coordinates of at least some of the structure points in the scene are invariant.

27. The method as claimed in claim 18, wherein the coordinates of at least one structure point are calculated in a coordinate system, which is referenced to the coordinate system of the spectacle frame, by evaluating displacements between the image representations of the structure points in the scene from different recording positions.

28. The method as claimed in claim 18, wherein a displacement of the structure points in the coordinate system is recognized by evaluating proximity relations between the structure points in the scene, and wherein the coordinates of structure points displaced in the scene are not taken into account when determining the refractive power distribution for the at least one section of the right spectacle lens and/or the left spectacle lens.

29. A method for measuring a refractive power distribution of a left and/or a right spectacle lens in a spectacle frame, wherein the local refractive power of the left and/or right spectacle lens is measured according to the method as claimed in claim 18 at a plurality of different locations on the left and/or right spectacle lens.

30. A non-transitory computer program product comprising a computer program having program code for carrying out the method as claimed in claim 18 when the computer program is loaded on a computer unit and/or executed on the computer unit.

31. A portable non-transitory computer-readable data medium, on which the computer program as claimed in claim 30 is stored.

32. An apparatus for measuring the local refractive power of a left and/or a right spectacle lens in a spectacle frame, the apparatus comprising:

an image capture device; and a computer unit, loaded onto which is a computer program with program code, the computer unit being configured to execute the method according to claim 18, wherein the computer unit is further configured to optionally measure the refractive power distribution of the left and/or the right spectacle lens in the spectacle frame by measuring the local refractive power at a plurality of different locations on the left and/or right spectacle lens.

33. The apparatus as claimed in claim 32, wherein the apparatus is configured as a smartphone, a tablet computer, or as a camera.

34. A method for measuring a local refractive power of a left and/or a right spectacle lens in a spectacle frame, the method comprising:

capturing at least one first image representation of a scene having a plurality of structure points and the left and/or the right spectacle lens in the spectacle frame with at least one image capture device from at least one first recording position having at least one imaging beam path for each of the plurality of structure points, the imaging beam path passing through the left and/or the right spectacle lens, capturing at least two further image representations of the scene with the left and/or the right spectacle lens with the at least one image capture device from at least two different further recording positions, which differ from the first recording position and which each have at least one imaging beam path for the structure points captured in the first image representation, the imaging beam paths not passing through the left and the right spectacle lens of the spectacle frame;

calculating coordinates of the plurality of structure points in a coordinate system from the at least two further image representations of the scene by image evaluation; and determining the local refractive power for at least one section of the left spectacle lens and/or for at least one section of the right spectacle lens from the coordinates of the plurality of structure points and the image of the structure points in the at least one first image representation of the scene with an inverted approach, in which an optical interfaces and/or the refractive index of the left and/or right spectacle lens are calculated from the imaging beam paths for the structure points.

* * * * *